(12) United States Patent
Reasoner et al.

(10) Patent No.: US 7,577,572 B2
(45) Date of Patent: Aug. 18, 2009

(54) SERVICE INVENTORY PROMPT AND ACTIONS

(75) Inventors: Kelly J. Reasoner, Fort Collins, CO (US); Curtis C. Ballard, Eaton, CO (US); Mike P. Fleischmann, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 734 days.

(21) Appl. No.: 11/259,221

(22) Filed: Oct. 26, 2005

(65) Prior Publication Data

US 2007/0130225 A1    Jun. 7, 2007

(51) Int. Cl.
 *G06Q 10/00* (2006.01)
 *G06Q 30/00* (2006.01)
(52) U.S. Cl. .............................. 705/1; 705/28
(58) Field of Classification Search ....................... None
See application file for complete search history.

(56) References Cited

U.S. PATENT DOCUMENTS

| 4,864,511 A * | 9/1989 | Moy et al. ................. 700/218 |
| 6,622,184 B1 * | 9/2003 | Tabe et al. ................... 710/36 |
| 2005/0251868 A1 * | 11/2005 | James ......................... 726/35 |

* cited by examiner

*Primary Examiner*—F. Ryan Zeender
*Assistant Examiner*—Asfand M Sheikh

(57) ABSTRACT

Backup storage apparatus and related methods wherein a controller and operator control panel are provided that cooperate to control functions and display information regarding the apparatus. The controller and operator control panel is configured to implement an inventory service level function that selectively displays a selectable skip inventory item, if the skip inventory item was selected, during a succeeding power-up cycle, displays a selectable take inventory item that overrides skipping of the inventory to cause the power-up inventory to be taken, displays a countdown timer that indicates a time period during which the take inventory item may be selected, and skips the power-up inventory if the take inventory item is not selected during the countdown period.

12 Claims, 3 Drawing Sheets

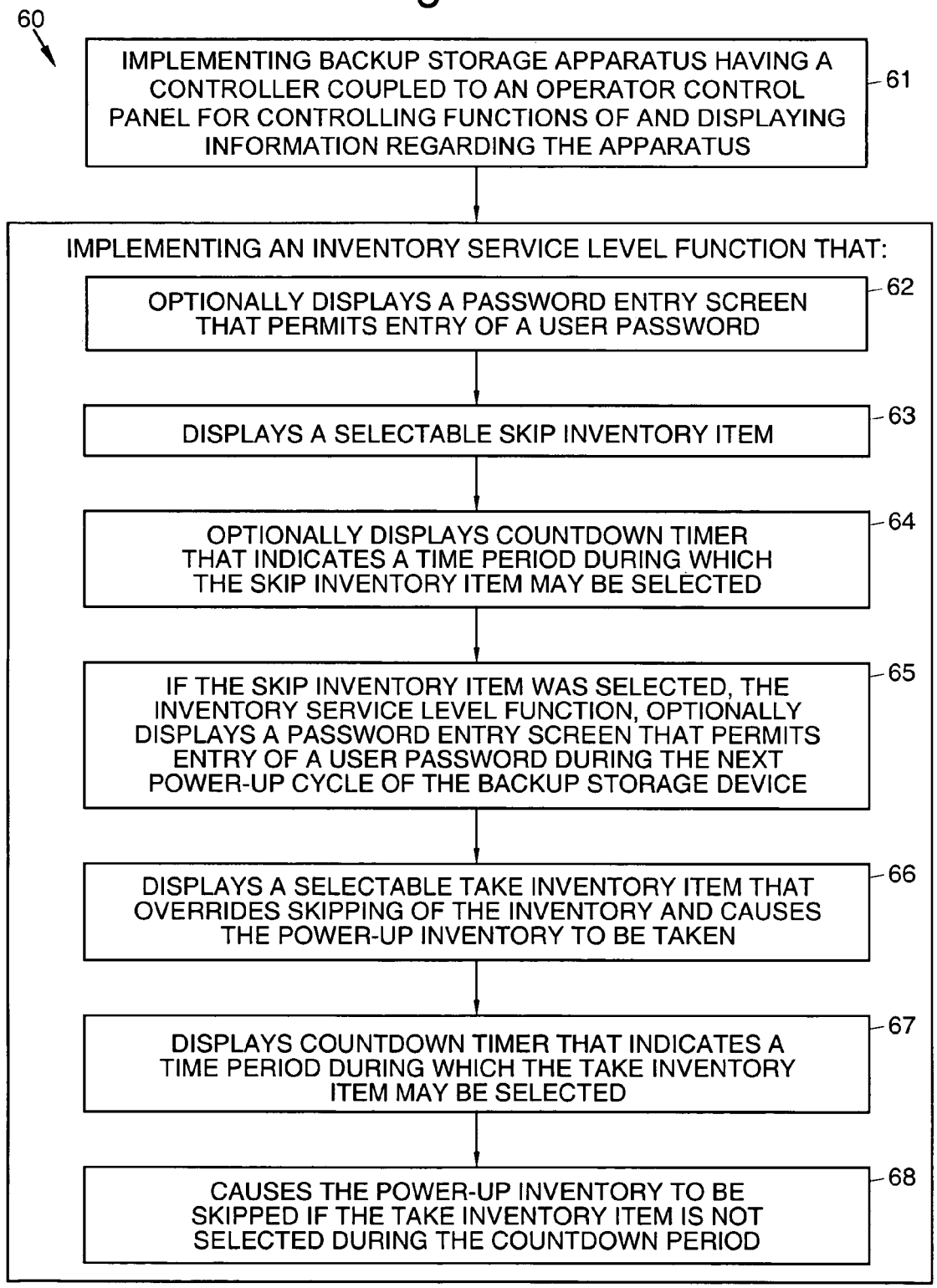

SERVICE INVENTORY PROMPT AND ACTIONS

BACKGROUND

Businesses, governmental agencies, learning institutions, and other organizations typically operate computers that are interconnected by a network. Network users often store data on hard drives of network servers. Users also store data on their host computers.

Data stored on the network and/or host computers is typically backed-up periodically to create a copy of the data to prevent it from being lost due to mechanical failure or accidental deletion, for example, and/or to produce an archive of the data. Backup operations typically involve storing a copy of all or a portion of the data files on the network and/or host computers to a backup device such as a magnetic tape library having a plurality of magnetic tape drives.

Digital magnetic tape has long been used for data storage in computer systems. The low cost-per-bit stored, long-term retention capability, and portability of magnetic tape cartridges have made them invaluable for storing large quantities of data generated by businesses.

Tape cartridges are used by automated tape library devices. Tape libraries generally handle many tape cartridges to store very large amounts of data. The tape libraries hold the tape cartridges in predefined positions or media slots. When data is required from a particular tape cartridge, a host system communicates via a Small Computer System Interface (SCSI) bus or a Fibre Channel (FC) fabric, for example, with a controller of the tape library. The controller retrieves the particular tape cartridge from its media slot and places the tape cartridge in a tape drive. The host system may then read from or write to the tape cartridge via the tape drive. Also, the host system may query the controller to determine the number of tape cartridges, tape drives, and robotics mechanisms contained in the tape library to manage the tape library.

There are a number of manufacturers of tape libraries that back up and store large quantities of data to digital magnetic tape cartridges. For example, a StorageWorks brand of tape libraries are manufactured in various sizes and configurations. The number of tape cartridges that can be loaded into such tape libraries varies depending upon model, but may be on the order of 400-500 tapes, for example.

A typical tape library usually has a control and display panel (or operator control panel) where local functions are controlled and where the health of the tape library may be displayed. The display typically presents information about components in the tape library that are built by the original library manufacturer. Value added components may also be installed in the tape library including software tools to aid in the configuration, installation, and management of the tape library.

Heretofore, when diagnosing a problem on a large tape library, for example, which may have on the order of 400-500 tape cartridges, for example, it is difficult to quickly perform tests because the library typically takes an inventory each power-up cycle. This can take over an hour each time for such large tape libraries. An operator, or service person, for example, is required to wait for the inventory to finish prior to attempting problem diagnosis. A service person often does not need to have a valid inventory to know if a fix of a problem has been effective. It would be desirable to temporarily eliminate the need to perform the tape inventory to allow efficient problem diagnosis.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 3 is a flow diagram that illustrates an exemplary method or algorithm for use with backup storage devices.

DETAILED DESCRIPTION

Backup storage apparatus 10 is disclosed and is discussed below in the context of a magnetic tape library 10. However, it is to be understood that the backup storage apparatus 10 is not limited only to magnetic tape libraries, but may be employed in the context of other backup storage devices and systems, including optical drives and hard disk drives, for example.

Figure 1:
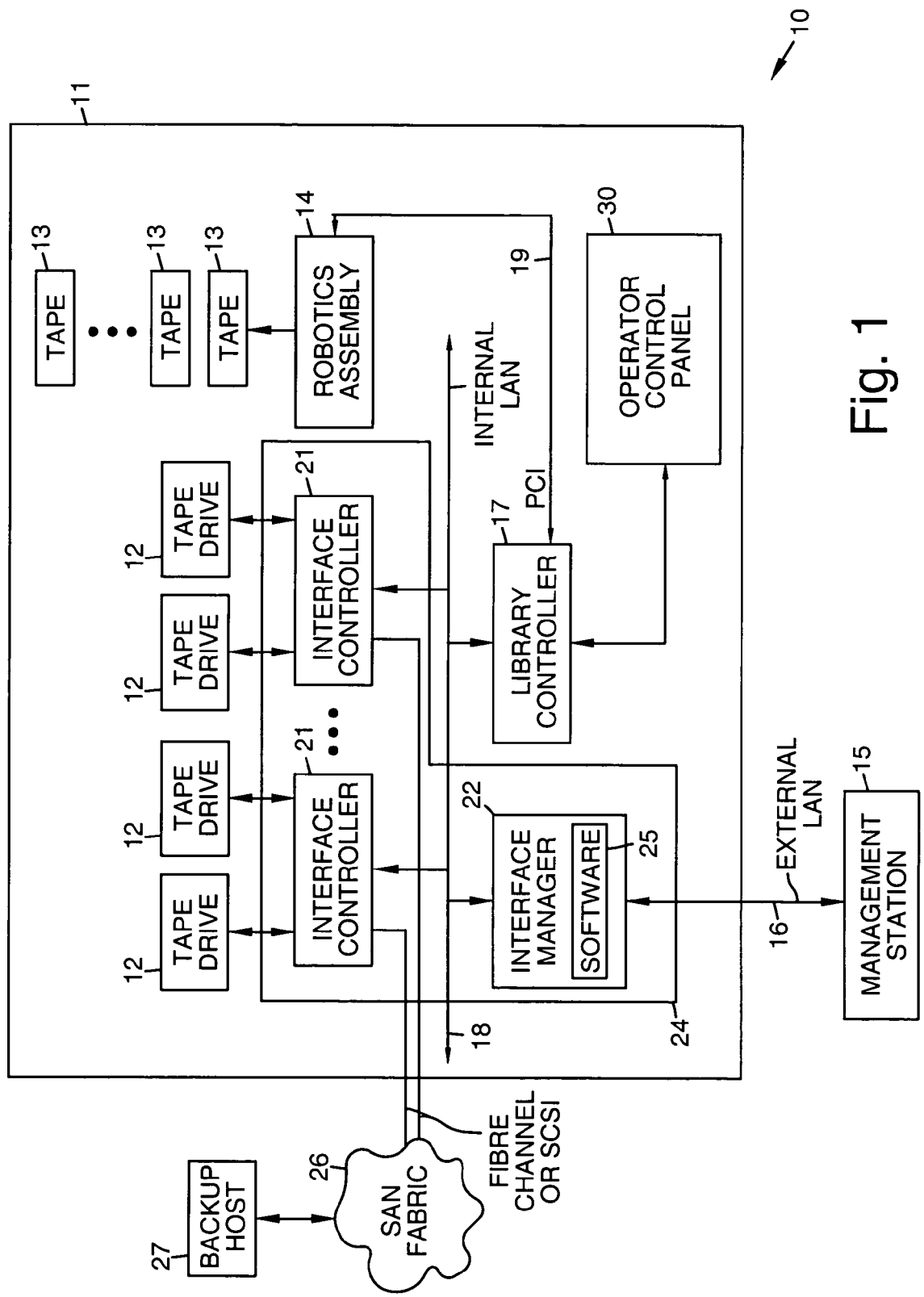
FIG. 1 is a block diagram that illustrates an exemplary backup storage device.

Referring to the drawing figures, FIG. 1 shows exemplary backup storage apparatus 10 comprising an exemplary tape library 10. The exemplary tape library 10 comprises a housing 11 in which a plurality of tape drives 12 (storage devices 12) are housed. A plurality of tape cartridges 13 (storage media 13) are loaded and stored in the housing 11 and which are manipulated by a robotics assembly 14 to load and unload them into a selected tape drive 12 to store data thereon or retrieve data therefrom. In other types of backup storage apparatus 10, the storage device 12 might comprise an optical disk reader used with optical disk media, or removable hard disk drives, for example.

An external management station 15 communicates with the tape library 10 by way of an external local area network (LAN) 16. The management station 15 is coupled by way of the external LAN 16 to a component 22 of the tape library 10 such as an interface manager 22 or management appliance 22. The interface manager 22 or management appliance 22 includes software tools 25 that aid in the configuration, installation, and management of the tape library 10, and specifically allow configuration and control of value added components 24 of the tape library 10. The interface manager 22 is coupled to an internal bus 18 comprising a communication link 18.

One or more interface controllers 21 may be coupled between selected tape drives 12 and the internal bus 18. The interface controllers 21 provide a communication path for the interface manager 22 to talk to the tape drives 12. The interface controllers 21 also provide a controlled data path between the tape drives 12 and a backup server 27. The backup server 27 communicates with the interface controllers 21 via a Fibre Channel fabric 26, shown in FIG. 1 as a storage area network (SAN) fabric 26, for example. A parallel data bus such as a Small Computer System Interface (SCSI) bus may be used in place of the Fibre Channel fabric 27, but this is not commonly used in current-generation computers.

The interface manager 22 or management appliance 22 and the interface controllers 21 comprise the value added components 24 of the tape library 10, i.e., components that may not be manufactured and installed by the original library manufacturer.

A library controller 17 is coupled by way of the internal bus 18 (communication link 18) to the one or more interface controllers 21 and to the interface manager 22 or management appliance 22. The library controller 17 is also coupled by the way of a private internal bus such as a PCI bus 19 to the robotics assembly 14.

The tape library 10 comprises an operator control panel and display system 30, referred to as an operator control panel 30, which is preferably disposed on a front panel of the tape library 10 for ease of use. The operator control panel 30 controls local functions and displays information regarding the tape library 10. The operator control panel 30 presents information about components of and processes relating to the tape library 10.

The operator control panel 30 comprises a graphical user interface (GUI) that displays library status information and allows a user to access the library menus. These menus allow a user to view or change the library settings, run demonstration programs, and run diagnostic tests, for example. Certain of these menus are illustrated in and are discussed with reference to FIGS. 2a and 2b.

Figure 2A:
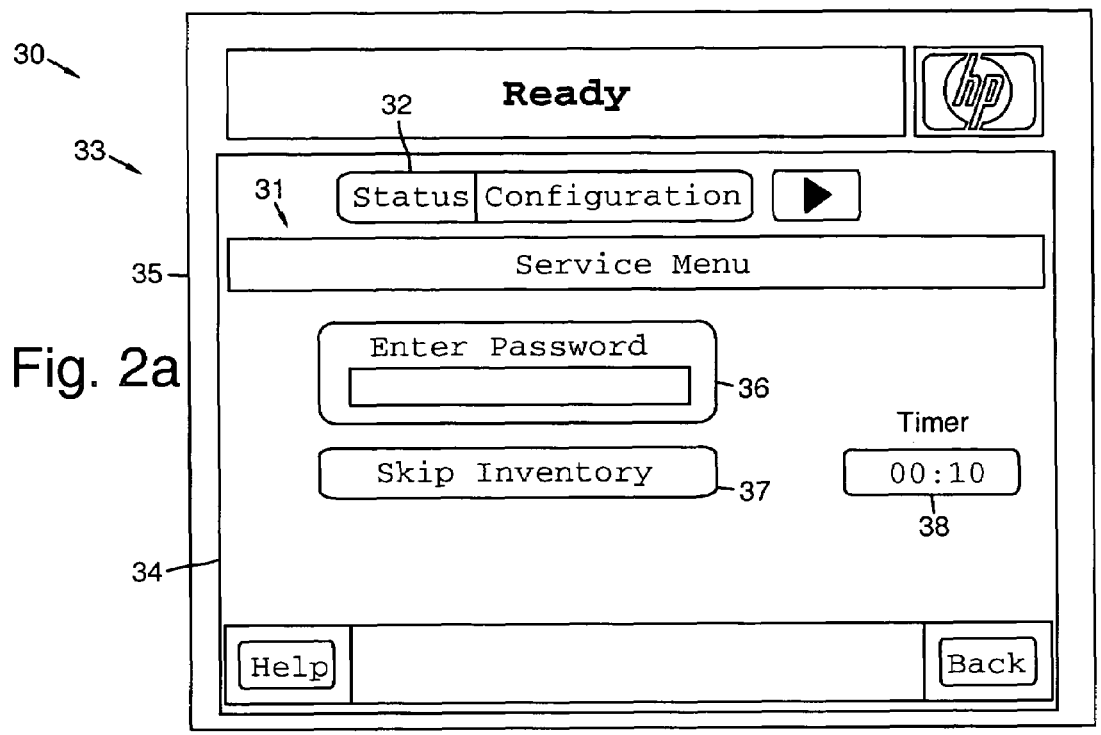
FIGS. 2a and 2b illustrate exemplary display screens of an exemplary inventory service level function for use in a backup storage device.
Figure 2B:
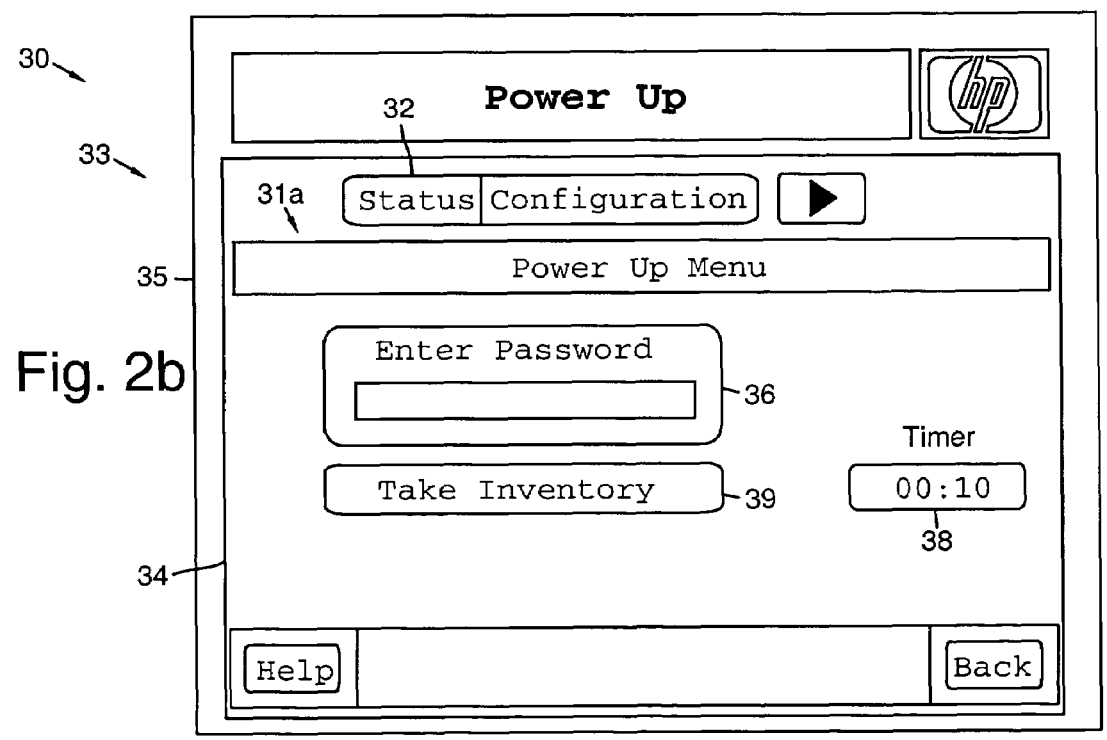

FIGS. 2a and 2b show exemplary screen displays 34 of a backup storage device 10, such as a tape library 10, or other device, for example. The exemplary screen displays 34 relate to an exemplary inventory service level function 33. The exemplary screen displays 34 and exemplary inventory service level function 33 may be presented on a display screen 35 of the operator control panel 30. In addition, the exemplary screen displays 34 and exemplary inventory service level function 33 may be presented on any available interface of the backup storage device 10, including a web-based GUI or command line interface to the interface manager 22, a serial user interface, a Telnet interface, or a Command View TL interface, for example.

The exemplary inventory service level function 33 is implemented using service menus 31 that are part of a menu structure or tree employed using the operator control panel 30. The operator control panel 30 has a menu structure that has many paths, of which the service menus 31 illustrated in FIGS. 2a and 2b are but two.

The exemplary screen display 34 shown in FIG. 2a may be arrived at by migrating through a number of screen displays 34 that present information relating to different aspects of the backup storage device 10, or tape library 10. Exemplary screen displays 34 may include Status, Configuration, Operation and Support screen displays 34, for example, two of which are shown in FIG. 2a.

Clicking on an appropriate selectable identifier 32 comprising a selectable menu item 32, representing the Status, Configuration, Operation and Support screen displays 34 takes the user to lower levels in the menu structure or tree relating to the particular information that is desired. The selectable identifier 32 may comprise an icon, selectable text, label or a banner, or other selectable area of the display screen 35, for example.

Status and Configuration selectable identifiers 32 are shown near the top of the screen displays 34 shown in FIGS. 2a and 2b. Other screen displays 34, such as Operation and Support screen displays 34, for example, may be viewed by clicking on the right pointing triangular arrow to the right of the Status and Configuration selectable identifiers 32. Selecting one of the selectable identifiers 32 takes the user to a subsequent screen display 34 of the menu structure. Help and Back icons are displayed that allow a user to access one or more help screens relating to what is displayed on the screen display 34, and to return to the previously displayed screen display 34.

FIG. 2a shows an exemplary inventory service level function 33 implemented in the operator control panel 30 and that is displayed by selecting (such as by touching or mouse clicking) a selectable identifier 32 corresponding to the service menu 31. The operator control panel 30 is configured to display a service level display screen 34 that implements the exemplary inventory service level function 33.

The exemplary inventory service level function 33 may present a password entry screen 36 that allows the user to enter his or her password. Once a correct password is entered, a skip inventory function 37 is activated that may comprise a selectable skip inventory item 37 which may be a selectable identifier. Such as an icon, text, label, banner, or other selectable area of the display screen 35, for example. An optional countdown timer 38, for example, may be presented that displays a time period during which the skip inventory item 37 may be selected.

If the skip inventory item 37 is selected during the countdown time period displayed by the countdown timer 38, the user will be able to skip taking a power-up inventory the next time the backup storage device 10, or tape library 10, is powered up. If the skip inventory item 37 is not selected during the countdown time period, an inventory is automatically taken the next time the backup storage device 10, or tape library 10, is powered up.

Referring to FIG. 2b, the next time the backup storage device 10, or tape library 10, is powered up, if the skip inventory item 37 was selected as described with reference to FIG. 2a, a power up menu 31a may be displayed which allows the user to enter his or her password by way of a password entry screen 36. Once a correct password is entered, a take inventory item 39 may be displayed that allows the user to override the actions taken to skip taking the inventory described with reference to FIG. 2a. An optional countdown timer 38, for example, may be presented that displays a time period during which the take inventory item 38 may be selected.

If the take inventory item 39 is selected during the countdown time period, a normal power-up inventory is taken, overriding the actions that were taken to skip the inventory described with reference to FIG. 2a. If the take inventory item 39 is not selected during the countdown time period, the inventory is skipped.

Skipping the task of taking the power-up inventory allows the user, such as a service technician, to perform tasks relating to the backup storage device 10, or tape library 10, that do not require that an inventory be taken. This allows the service technician to perform tests and diagnose problems without waiting for an inventory to be taken. This eliminates the need to wait on the order of an hour for the inventory process to complete before tests and servicing can be performed.

During normal operation of the backup storage device 10, or tape library 10, an inventory is taken at power-up which is stored in a nonvolatile memory of the backup storage device 10. The default action taken by the backup storage device 10, or tape library 10, is to validate the inventory of the backup storage device 10, or tape library 10. The above-described inventory service level function 33 overrides the normal inventory taking operation to temporarily disable taking the power-up inventory.

During use of the inventory service level function 33, a user, such as a service technician, for example, migrates to the service menu 31 (FIG. 2a) of the operator control panel 30 and enters a service-only password using the password entry screen 36, for example. Once the skip inventory item 37 is displayed, the service person may select it, allowing him or her to skip taking an inventory during the next power-up cycle of the backup storage device 10, or tape library 10. As is shown in FIG. 2b, if the skip inventory item 37 was selected, when the backup storage apparatus 10 is powered up again, a prompt 39 (such as the take inventory item 39) may be displayed for a short time indicated by the countdown timer 38, and if it is selected during the countdown period, the power-up inventory is taken, overriding the previous actions taken to skip taking the inventory. If the take inventory item 39 is not selected during the countdown period, the power-up inventory is skipped and not taken. The service technician is free to work on the backup storage device 10, or tape library 10, without waiting for the normally required power-up inventory.

FIG. 3 is a flow diagram that illustrates an exemplary method 60 or algorithm 60 for use in the backup storage apparatus 10. The exemplary method 60 or algorithm 60 may be used with storage apparatus 10 such as magnetic tape libraries, optical drives and hard disk drives, for example. The exemplary method 60 or algorithm 60 comprises the following actions.

Backup storage apparatus 10, such as a tape library 10, for example, is implemented 61 that comprises a controller 17 that controls and monitors a robotics assembly 14 that loads and unloads media 13, such as tape cartridges 13, into and from at least one storage device 12, and an operator control panel 30 coupled to the controller 17 that controls functions of and displays information regarding the backup storage apparatus 10.

An inventory service level function 33 optionally displays 62 a password entry screen 36 that permits entry of a user password, displays 63 a selectable skip inventory item 37, and optionally displays 64 a countdown timer 38 that indicates a time period during which the skip inventory item 37 may be selected.

During the next power-up cycle of the backup storage device 10, if the skip inventory item 37 was selected, the inventory service level function 33 optionally displays 65 a password entry screen 36 that permits entry of a user password, displays 66 a selectable take inventory item 39 that overrides skipping of the inventory and causes the power-up inventory to be taken, and displays 67 countdown timer 38 that indicates a time period during which the take inventory item 39 may be selected. If the take inventory item 39 is not selected during the countdown period, the inventory service level function 33 causes 68 the power-up inventory to be skipped.

Thus, improved backup storage apparatus and methods or algorithms have been disclosed that allow a user to selectively turn on and off an inventory function. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. Backup storage apparatus comprising:
   a controller for controlling and monitoring a robotics assembly that loads and unloads storage media into and from at least one storage device; and
   an operator control panel coupled to the controller for controlling functions of and displaying information regarding the apparatus, and comprising an inventory service level function that:
   selectively displays a selectable skip inventory item; and
   if the skip inventory item is selected, during a succeeding power-up cycle,
   (1) displays a selectable take inventory item that overrides skipping of the inventory to cause the power-tip inventory to be taken, (2) displays a countdown timer that indicates a time period during which the take inventory item may be selected, and (3) skips the power-up inventory if the take inventory item is not selected during the countdown period.

2. The apparatus recited in claim 1 wherein the inventory service level function further displays a password entry screen that permits entry of a user password to allow selection of the skip inventory item.

3. The apparatus recited in claim 1 wherein the inventory service level function further displays a countdown timer that indicates a time period during which the skip inventory item may be selected.

4. The apparatus recited in claim 1 wherein the inventory service level function further displays a password entry screen that permits entry of a user password to allow selection of the take inventory item.

5. Apparatus comprising:
   controller means for controlling and monitoring a robotics assembly that loads and unloads storage media into and from at least one storage device; and
   operator control means coupled to the controller for controlling functions of and displaying information regarding the apparatus, and comprising an inventory service level function that:
   selectively displays a selectable skip inventory item; and
   if the skip inventory item is selected, during a succeeding power-up cycle,
   (1) displays a selectable take inventory item that overrides skipping of the inventory to cause the power-up inventory to be taken, (2) displays a countdown timer that indicates a time period during which the take inventory item may be selected, and (3) skips the power-up inventory if the take inventory item is not selected during the countdown period.

6. The apparatus recited in claim 5 wherein the inventory service level function further displays a password entry screen that permits entry of a user password to allow selection of the skip inventory item.

7. The apparatus recited in claim 5 wherein the inventory service level function further displays a countdown timer that indicates a time period during which the skip inventory item may be selected.

8. The apparatus recited in claim 5 wherein the inventory service level function further displays a password entry screen that permits entry of a user password to allow selection of the take inventory item.

9. A method for use with backup storage apparatus, comprising:
   providing backup storage apparatus comprising a controller coupled to an operator control panel that cooperates to control functions of and display information regarding the apparatus;
   displaying a selectable skip inventory item;
   if the skip inventory item is selected, during a succeeding power-up cycle: displaying a selectable take inventory item that overrides skipping of the inventory to cause the power-up inventory to be taken;
   displaying a countdown timer that indicates a time period during which the take inventory item may be selected; and
   skipping the power-up inventory if the take inventory item is not selected during the countdown period.

10. The method recited in claim 9 further comprising displaying a password entry screen that permits entry of a user password to allow selection of the skip inventory item.

11. The method recited in claim 9 further comprising displaying a countdown timer that indicates a time period during which the skip inventory item may be selected.

12. The method recited in claim 9 further comprising displaying a password entry screen that permits entry of a user password to allow selection of the take inventory item.

* * * * *

UNITED STATES PATENT AND TRADEMARK OFFICE
CERTIFICATE OF CORRECTION

PATENT NO. : 7,577,572 B2 Page 1 of 1
APPLICATION NO. : 11/259221
DATED : August 18, 2009
INVENTOR(S) : Kelly J. Reasoner et al.

It is certified that error appears in the above-identified patent and that said Letters Patent is hereby corrected as shown below:

In column 6, line 5, in Claim 1, delete "power-tip" and insert -- power-up --, therefor.

Signed and Sealed this

Sixteenth Day of March, 2010

David J. Kappos
*Director of the United States Patent and Trademark Office*